(12) United States Patent
McColgan et al.

(10) Patent No.: US 11,841,964 B2
(45) Date of Patent: Dec. 12, 2023

(54) SYSTEM AND METHOD FOR AUTHORIZING SECURE SNAPSHOT DELETION

(71) Applicant: EMC IP Holding Company, LLC, Hopkinton, MA (US)

(72) Inventors: Lee M. McColgan, Brattleboro, VT (US); Gregory W. Lazar, Upton, MA (US); Michael Zeldich, Newton, MA (US); Nagasimha G. Haravu, Apex, NC (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 244 days.

(21) Appl. No.: 17/508,019

(22) Filed: Oct. 22, 2021

(65) Prior Publication Data
US 2023/0131333 A1    Apr. 27, 2023

(51) Int. Cl.
G06F 21/62    (2013.01)
H04L 9/30    (2006.01)
G06F 21/30    (2013.01)

(52) U.S. Cl.
CPC .......... *G06F 21/6218* (2013.01); *G06F 21/30* (2013.01); *H04L 9/30* (2013.01)

(58) Field of Classification Search
CPC .. G06F 21/6218; G06F 21/30; G06F 11/1458; G06F 2201/84; G06F 2221/2143; H04L 9/30; H04L 9/0894; H04L 9/3271
See application file for complete search history.

(56) References Cited

U.S. PATENT DOCUMENTS

| | | | |
|---|---|---|---|
| 7,593,973 B2 * | 9/2009 | Lee | G06F 11/1448 |
| 11,294,856 B2 * | 4/2022 | Wang | G06F 16/128 |
| 2021/0034246 A1 * | 2/2021 | Haravu | G06F 16/128 |
| 2021/0406216 A1 * | 12/2021 | Komatsu | G06F 16/128 |

* cited by examiner

*Primary Examiner* — Han Yang
(74) *Attorney, Agent, or Firm* — Brian J. Colandreo; Heath M. Sargeant; Holland & Knight LLP

(57) ABSTRACT

A method, computer program product, and computing system for receiving a selection of one or more secure snapshots to remove from a storage system. A snapshot deletion key may be received from the storage system. The selection of the one or more secure snapshots and the snapshot deletion key may be provided to a storage system support service. A snapshot deletion response may be received from the storage system support service. The snapshot deletion response and the selection of the one or more secure snapshots may be authenticated via the storage system. In response to authenticating the snapshot deletion response and the selection of the one or more secure snapshots, the one or more secure snapshots may be unlocked for deletion.

20 Claims, 4 Drawing Sheets

SYSTEM AND METHOD FOR AUTHORIZING SECURE SNAPSHOT DELETION

BACKGROUND

Storing and safeguarding electronic content may be beneficial in modern business and elsewhere. Accordingly, various methodologies may be employed to protect and distribute such electronic content.

Attacks on customer enterprises, in the form of malware, can pose a significant threat to data on storage systems, particularly if these systems are attached, either directly or via a storage area network (SAN), to hosts. Ransomware attacks are a good example in which malware infects a host and initiates a process of encrypting primary storage volumes, that are attached to the host. If the malware can obtain administrative credentials, such as to the storage system, it could also initiate the deletion of the corresponding snapshots of the data, to ensure that customer cannot recover and would have to pay a ransom to recover their data. While multi-factor authentication (MFA) is a means to mitigate this particular aspect of the attack, recent attacks have shown that MFA may be bypassed.

These issues have encouraged the use of secure snapshots in the storage system where special snapshots can be created with an expiration time that automatically deletes the snapshot at its expiration time. Users, even with administrative privileges, cannot modify or delete these snapshots, thereby protecting these copies from malware attacks. However, there are times when it may be desirable to modify or delete secure snapshots for legitimate reasons. For example, the storage system may be running low on available space and the secure snapshots need to be deleted. Accordingly, secure snapshots may introduce protections while also introducing significant limitations on the ability for users to modify or remove particular snapshots.

SUMMARY OF DISCLOSURE

In one example implementation, a computer-implemented method executed on a computing device may include, but is not limited to, receiving a selection of one or more secure snapshots to remove from a storage system. A snapshot deletion key may be received from the storage system. The selection of the one or more secure snapshots and the snapshot deletion key may be provided to a storage system support service. A snapshot deletion response may be received from the storage system support service. The snapshot deletion response and the selection of the one or more secure snapshots may be authenticated via the storage system. In response to authenticating the snapshot deletion response and the selection of the one or more secure snapshots, the one or more secure snapshots may be unlocked for deletion.

One or more of the following example features may be included. The selection of the one or more secure snapshots to remove from a storage system include a list of one or more predefined universally unique identifiers (UUIDs) assigned to the one or more secure snapshots. The snapshot deletion key may be unique to the storage system. Providing the selection of the one or more secure snapshots and the snapshot deletion key to a storage system support service may include authenticating, via the storage system support service, the selection of one or more secure snapshots to remove from a storage system. Authenticating, via the storage system, the snapshot deletion response and the selection of the one or more secure snapshots may include providing the snapshot deletion response and the selection of the one or more secure snapshots to the storage system. Authenticating, via the storage system, the snapshot deletion response and the selection of the one or more secure snapshots may include authenticating, via the storage system, the snapshot deletion response based upon, at least in part, an asymmetric cryptographic system. Unlocking the one or more secure snapshots for deletion may include providing a limited period of time for unlocking the one or more secure snapshots for deletion.

In another example implementation, a computer program product resides on a computer readable medium that has a plurality of instructions stored on it. When executed by a processor, the instructions cause the processor to perform operations that may include, but are not limited to, receiving a selection of one or more secure snapshots to remove from a storage system. A snapshot deletion key may be received from the storage system. The selection of the one or more secure snapshots and the snapshot deletion key may be provided to a storage system support service. A snapshot deletion response may be received from the storage system support service. The snapshot deletion response and the selection of the one or more secure snapshots may be authenticated via the storage system. In response to authenticating the snapshot deletion response and the selection of the one or more secure snapshots, the one or more secure snapshots may be unlocked for deletion.

One or more of the following example features may be included. The selection of the one or more secure snapshots to remove from a storage system include a list of one or more predefined universally unique identifiers (UUIDs) assigned to the one or more secure snapshots. The snapshot deletion key may be unique to the storage system. Providing the selection of the one or more secure snapshots and the snapshot deletion key to a storage system support service may include authenticating, via the storage system support service, the selection of one or more secure snapshots to remove from a storage system. Authenticating, via the storage system, the snapshot deletion response and the selection of the one or more secure snapshots may include providing the snapshot deletion response and the selection of the one or more secure snapshots to the storage system. Authenticating, via the storage system, the snapshot deletion response and the selection of the one or more secure snapshots may include authenticating, via the storage system, the snapshot deletion response based upon, at least in part, an asymmetric cryptographic system. Unlocking the one or more secure snapshots for deletion may include providing a limited period of time for unlocking the one or more secure snapshots for deletion.

In another example implementation, a computing system includes at least one processor and at least one memory architecture coupled with the at least one processor, wherein the at least one processor is configured to receive a selection of one or more secure snapshots to remove from a storage system. The at least one processor may be further configured to receive a snapshot deletion key from the storage system. The at least one processor may be further configured to provide the selection of the one or more secure snapshots and the snapshot deletion key to a storage system support service. The at least one processor may be further configured to receive a snapshot deletion response from the storage system support service. The at least one processor may be further configured to authenticate the snapshot deletion response and the selection of the one or more secure snapshots via the storage system. In response to authenticating the snapshot deletion response and the selection of the one or more secure snapshots, the at least one processor may be further configured to unlock the one or more secure snapshots for deletion.

One or more of the following example features may be included. The selection of the one or more secure snapshots to remove from a storage system include a list of one or more predefined universally unique identifiers (UUIDs) assigned to the one or more secure snapshots. The snapshot deletion key may be unique to the storage system. Providing the selection of the one or more secure snapshots and the snapshot deletion key to a storage system support service may include authenticating, via the storage system support service, the selection of one or more secure snapshots to remove from a storage system. Authenticating, via the storage system, the snapshot deletion response and the selection of the one or more secure snapshots may include providing the snapshot deletion response and the selection of the one or more secure snapshots to the storage system. Authenticating, via the storage system, the snapshot deletion response and the selection of the one or more secure snapshots may include authenticating, via the storage system, the snapshot deletion response based upon, at least in part, an asymmetric cryptographic system. Unlocking the one or more secure snapshots for deletion may include providing a limited period of time for unlocking the one or more secure snapshots for deletion.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
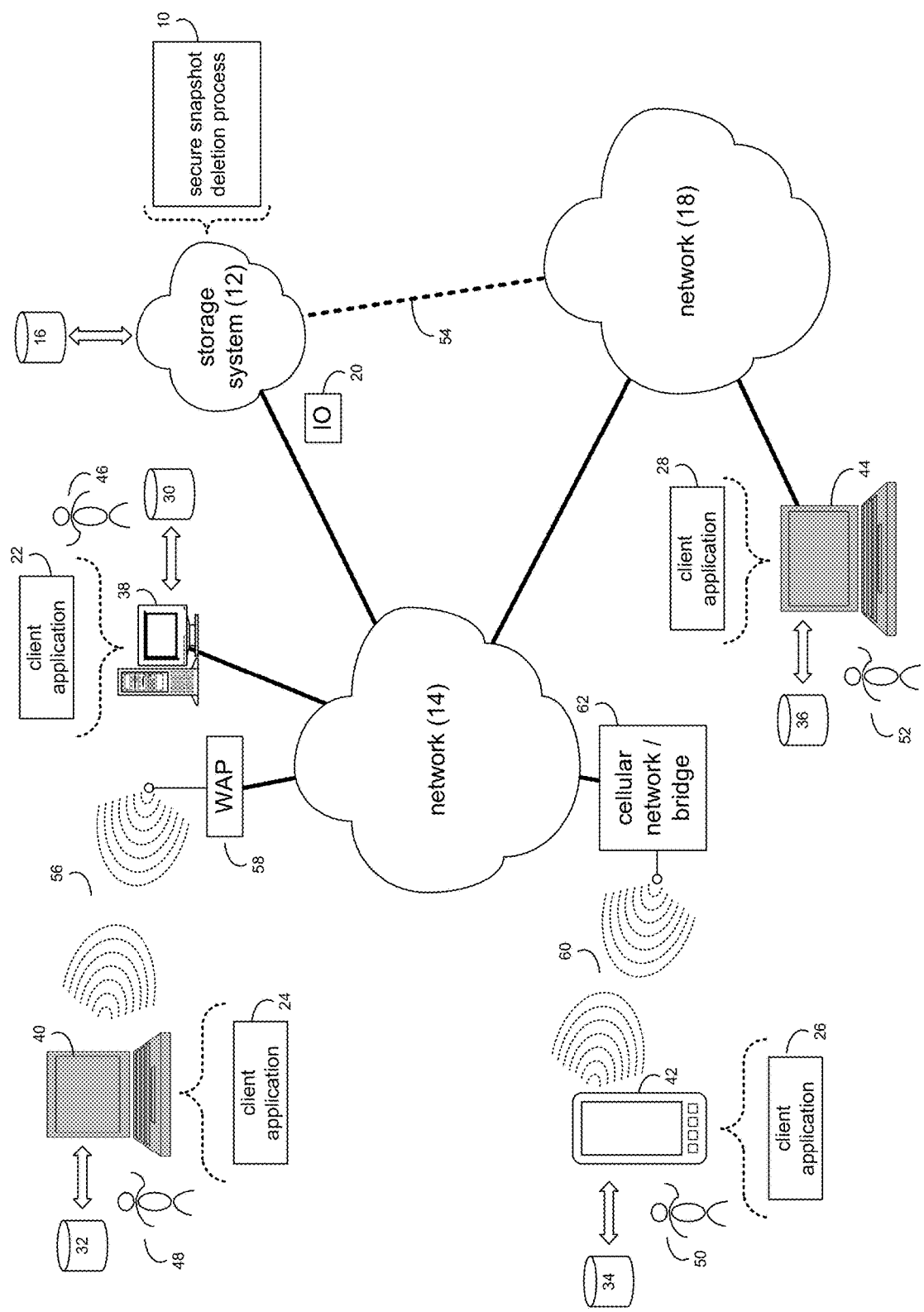
FIG. 1 is an example diagrammatic view of a storage system and a secure snapshot deletion process coupled to a distributed computing network according to one or more example implementations of the disclosure.

System Overview:

Referring to FIG. 1, there is shown secure snapshot deletion process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of secure snapshot deletion process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of secure snapshot deletion process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a secure snapshot deletion process, such as secure snapshot deletion process 10 of FIG. 1, may include but is not limited to, receiving a selection of one or more secure snapshots to remove from a storage system. A snapshot deletion key may be received from the storage system. The selection of the one or more secure snapshots and the snapshot deletion key may be provided to a storage system support service. A snapshot deletion response may be received from the storage system support service. The snapshot deletion response and the selection of the one or more secure snapshots may be authenticated via the storage system. In response to authenticating the snapshot deletion response and the selection of the one or more secure snapshots, the one or more secure snapshots may be unlocked for deletion.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
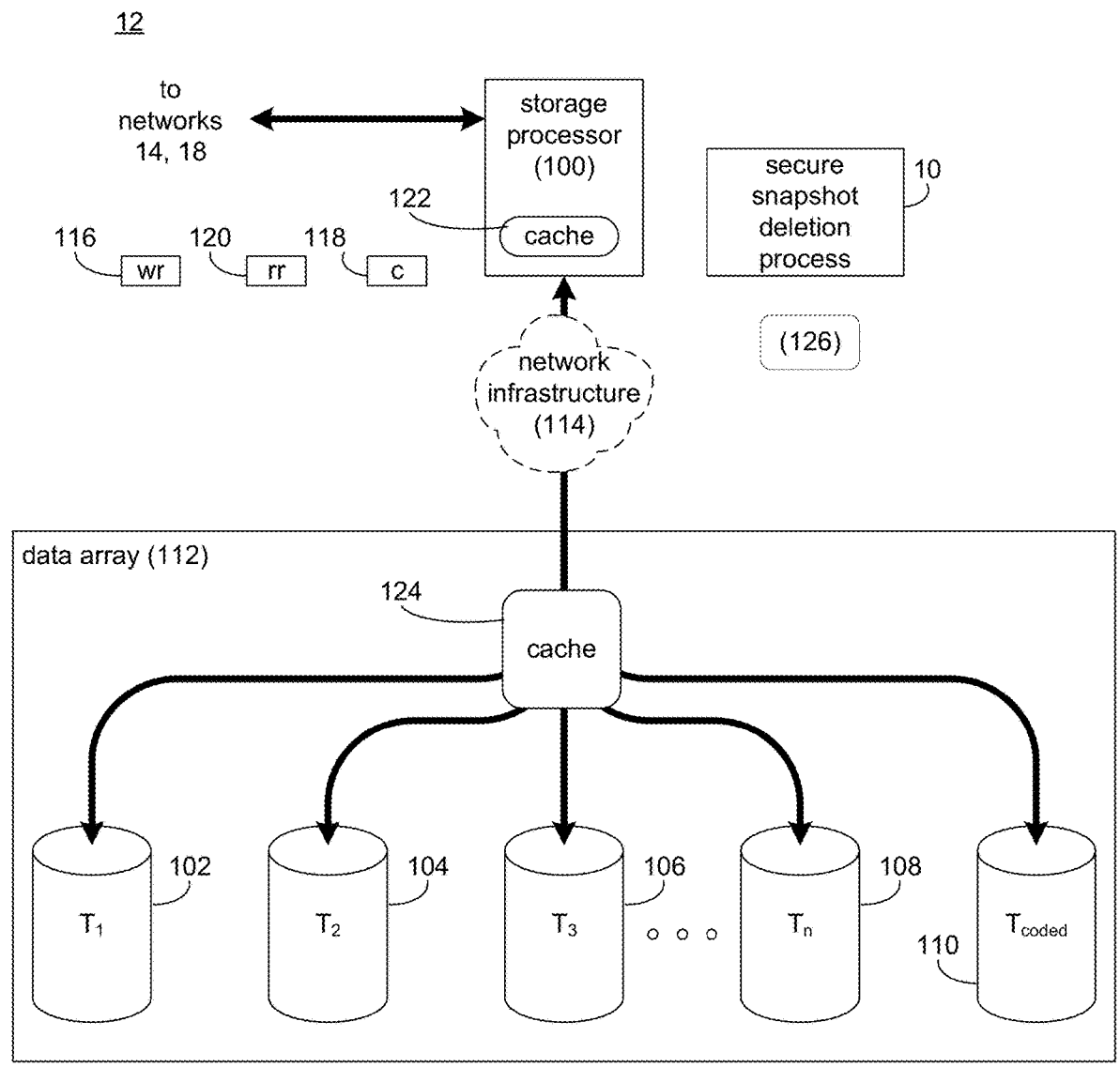
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of secure snapshot deletion process 10. The instruction sets and subroutines of secure snapshot deletion process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of secure snapshot deletion process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of secure snapshot deletion process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of secure snapshot deletion process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 3:
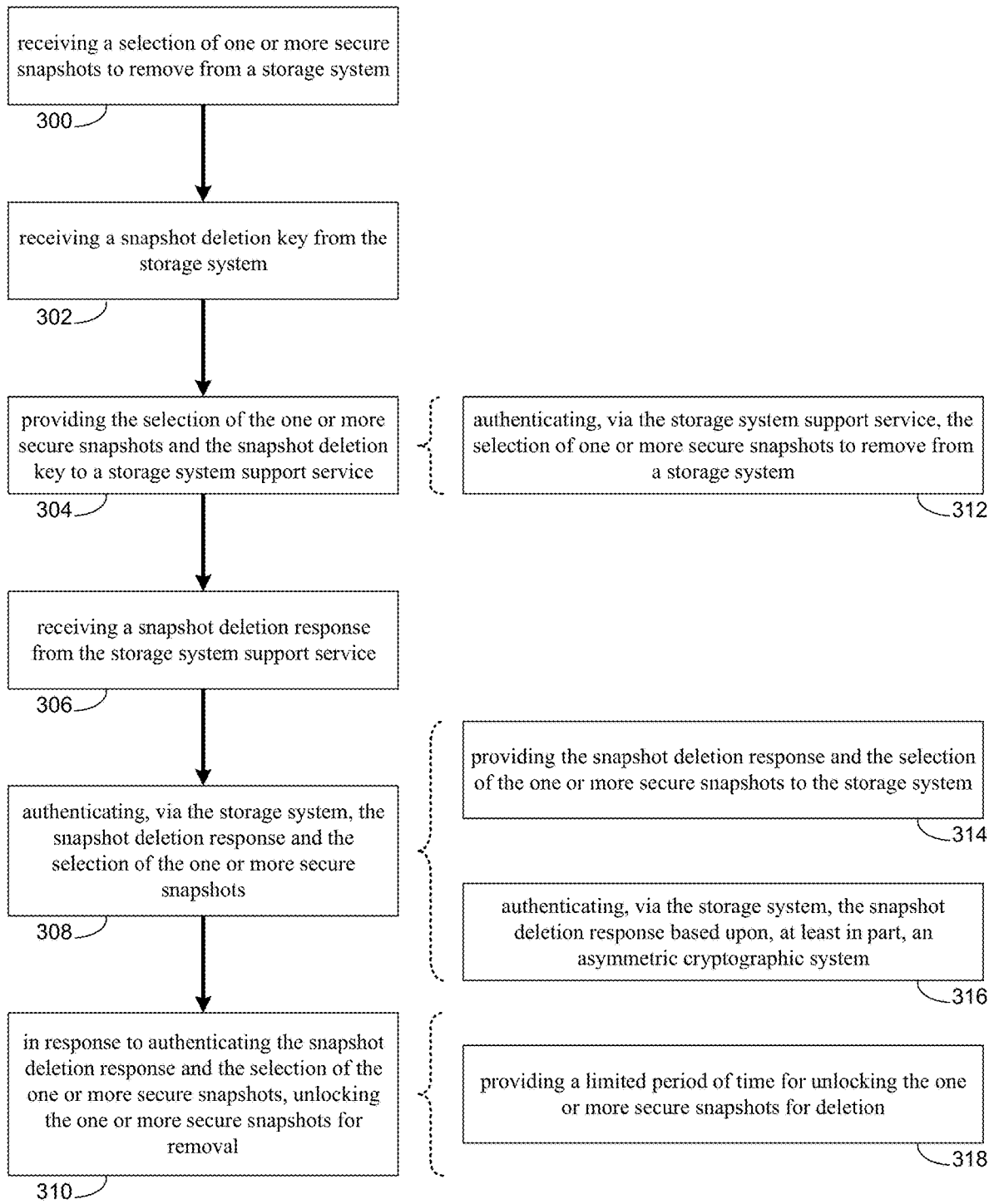
FIG. 3 is an example flowchart of secure snapshot deletion process according to one or more example implementations of the disclosure.
Figure 4:
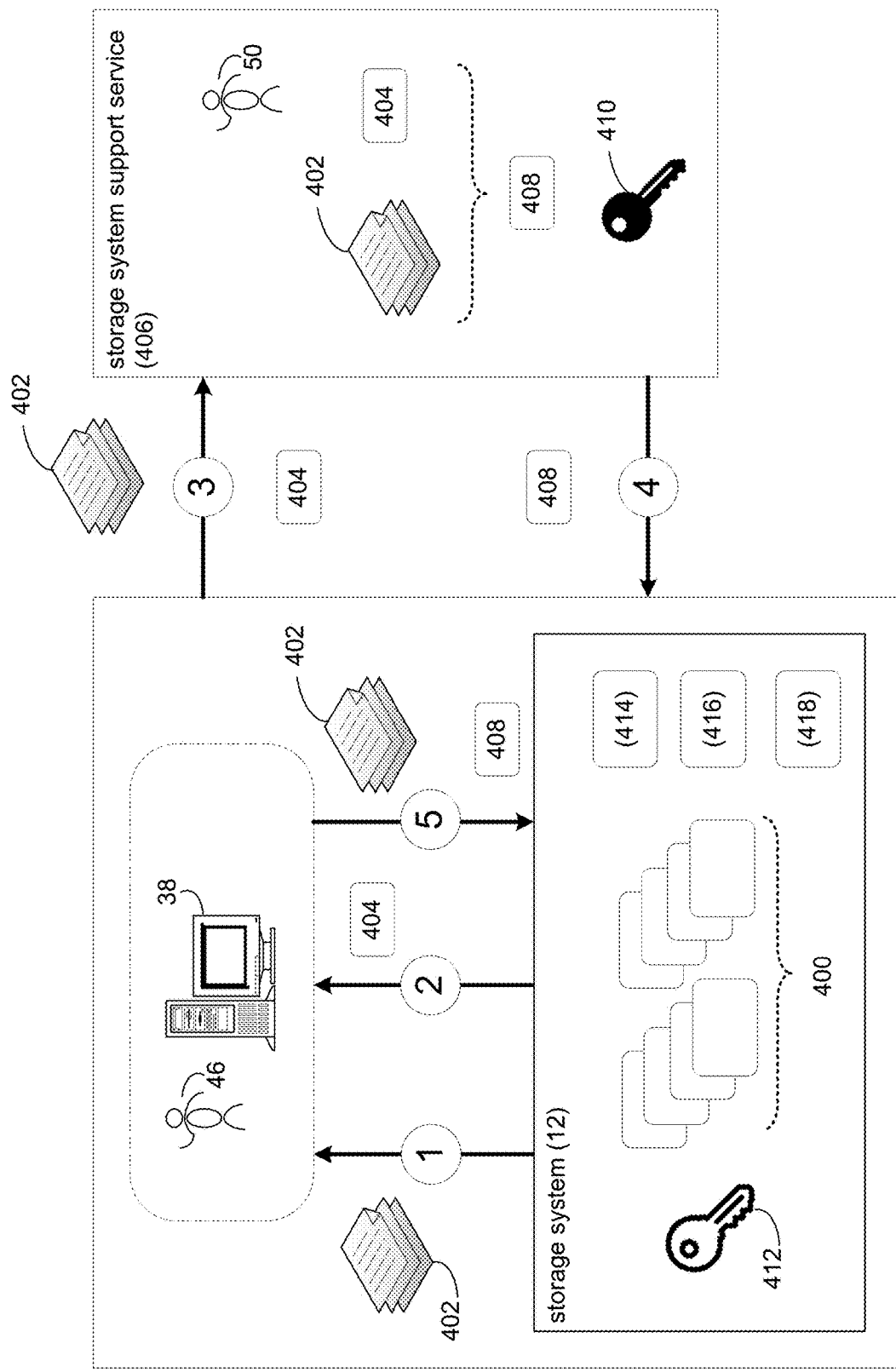
FIG. 4 is an example diagrammatic view of the storage system of FIG. 1 according to one or more example implementations of the disclosure.

The Secure Snapshot Deletion Process:

Referring also to the examples of FIGS. 3-4 and in some implementations, secure snapshot deletion process 10 may receive 300 a selection of one or more secure snapshots to remove from a storage system. A snapshot deletion key may be received 302 from the storage system. The selection of the one or more secure snapshots and the snapshot deletion key may be provided 304 to a storage system support service. A snapshot deletion response may be received 306 from the storage system support service. The snapshot deletion response and the selection of the one or more secure snapshots may be authenticated 308 via the storage system. In response to authenticating the snapshot deletion response and the selection of the one or more secure snapshots, the one or more secure snapshots may be unlocked 310 for deletion.

As will be discussed in greater detail below, implementations of the present disclosure may allow for secure snapshots to be safely removed without compromising access to the secure snapshots. For example, attacks on customer enterprises, in the form of malware, can pose a significant threat to data on storage systems, particularly if these systems are attached, either directly or via a storage area network (SAN), to hosts. Ransomware attacks are a good example in which malware infects a host and initiates a process of encrypting primary storage volumes, that are attached to the host. If the malware can obtain administrative credentials, such as to the storage system, it could also initiate the deletion of the corresponding snapshots of the data, to ensure that customer cannot recover and would have to pay a ransom to recover their data. While multi-factor authentication (MFA) is a means to mitigate this particular aspect of the attack, recent attacks have shown that MFA may be bypassed.

These issues have encouraged the use of secure snapshots in the storage system where special snapshots can be created with an expiration time that automatically gets deleted at its expiration time. Users, even with administrative privileges, cannot modify or delete these snapshots, thereby protecting these copies from malware attacks. However, there are times when secure snapshots need to be modified or deleted by users for legitimate reasons. For example, the storage system may be running low on available space and the secure snapshots need to be deleted. Accordingly, secure snapshots may introduce protections while also introducing significant limitations on the ability for users to modify or remove particular snapshots.

Existing products such as PowerMax or XtremIO from Dell EMC of Hopkinton, Massachusetts have established a procedure by which customers contact Dell customer support, go through an extensive authentication procedure, following which the Dell support personnel remotely connects to the storage system and manually deletes the secure snapshots requested by the customer. While this procedure may work for certain configurations and customers, engaging support personnel to manually delete user snapshots may become prohibitively inefficient and expensive for other types or sizes of storage systems such as PowerStore with thousands of systems deployed worldwide. Applications of the present disclosure provide an approach where storage system administrators may engage in a self-service model for deleting or removing secure snapshots.

In some implementations, secure snapshot deletion process 10 may receive 300 a selection of one or more secure snapshots to remove from a storage system. As discussed above, a secure snapshot is a snapshot that cannot be deleted before the expiry time set by a storage system administrator and/or a storage system support service. For example, a user (e.g., user 46) may identify and select particular secure snapshots from a plurality of secure snapshots stored within a storage system (e.g., plurality of snapshots 400 stored within storage system 12). In one example, the user (e.g., user 46) may obtain a predefined form or other document configured to receive 300 the listing of the one or more secure snapshots that the user would like to remove from the storage system (e.g., storage system 12). The form may allow the user to list each of the one or more secure snapshots to remove from the storage system. The form may also include other required information. For example, the form may include required signatures or indicia of approval from predefined roles or users preauthorized for the storage system. The form may include particular authorization content or keys that allow a support service to authenticate the user's request.

Referring also to FIG. 4 and in some implementations, secure snapshot deletion process 10 may receive 300 a selection of one or more secure snapshots (e.g., one or more secure snapshots 402) for deletion from the storage system (e.g., storage system 12). Referring again to FIG. 4, this is shown as the arrow from storage system 12 to client electronic device 38 labeled "1". While "1" may indicate a first step, it will be appreciated that receiving 300 the selection of the one or more secure snapshots (e.g., one or more secure snapshots 402) may happen at any point during secure snapshot deletion process 10 (i.e., before or after any number of preceding or subsequent actions).

In some implementations, the selection of the one or more secure snapshots to remove from a storage system include a list of one or more predefined universally unique identifiers (UUIDs) assigned to the one or more secure snapshots. As is known in the art, a universally unique identifier (UUID) is a e.g., 128-bit label used for uniquely labeling information in computer systems. While an example of a 128-bit label has been provided, it will be appreciated that the UUID may include any number of bits within the scope of the present disclosure. The UUIDs may be assigned for each secure snapshot when generating the secure snapshot.

In some implementations, secure snapshot deletion process 10 may receive a listing of UUIDs assigned to the secure snapshots for management by a storage system support service. In this manner, a storage system support service may be configured to manage the creation and/or deletion of secure snapshots such that a user of the storage system may be unable to remove or delete the secure snapshots without approval from the storage system support service.

Secure snapshot deletion process 10 may receive 302 a snapshot deletion key from the storage system. A snapshot deletion key (e.g., snapshot deletion key 404) may include an identifier for the storage system. The snapshot deletion key (e.g., snapshot deletion key 404) may be unique to the storage system. Secure snapshot deletion process 10 may assign an initial snapshot deletion key (e.g., snapshot deletion key 404) when the storage system (e.g., storage system 12) is initialized. Secure snapshot deletion process 10 may receive updated snapshot deletion keys for the storage system (e.g., storage system 12) at various intervals. For example, secure snapshot deletion process 10 may periodically "roll over" the snapshot deletion key to a new random value or string. In some implementations, the snapshot deletion key (e.g., snapshot deletion key 404) may be one-way hashed using a hash algorithm (e.g., any hash algorithm known in the art). For example and as will be discussed in greater detail below, the snapshot deletion key (e.g., snapshot deletion key 404) may be a portion of an asymmetric cryptographic system for authenticating a snapshot deletion response.

Receiving 302 the snapshot deletion key from the storage system may include providing a user interface for a user to log into (e.g., via predefined credentials). The user may indicate, via a button or other GUI element, to the storage system, that the user wishes to permit the deletion of secure snapshots temporarily, for space reclamation. In response to receiving this indication, secure snapshot deletion process 10 may return the snapshot deletion key (e.g., snapshot deletion key 404) to the user. Referring again to FIG. 4, this is shown as the arrow between storage system 12 and client electronic device 38 labeled "2". While "2" may indicate a second step, it will be appreciated that receiving 302 the snapshot deletion key (e.g., snapshot deletion key 404) may happen at any point during secure snapshot deletion process 10 (i.e., before or after any number of preceding or subsequent actions).

Secure snapshot deletion process 10 may provide 304 the selection of the one or more secure snapshots and the snapshot deletion key to a storage system support service. A storage system support service may generally include a service or organization configured to manage the ability to access and/or delete particular secure snapshots from a storage system. For example, the storage system support service (e.g., storage system support service 406) may include a customer service machine, individual, or group configured to process requests from storage system administrators. In one example, the storage system support service (e.g., storage system support service 406) may include customer service engineers from a storage system manufacturer (e.g., Dell EMC of Hopkinton, Massachusetts). However, it will be appreciated that the storage system support service may include any other entity configured to provide secure management over the ability to delete secure snapshots within the scope of the present disclosure. Unlike conventional approaches to removing secure snapshots, no individual actor (e.g., the storage system administrator or the storage system support service) can unilaterally delete secure snapshots when utilizing secure snapshot deletion process 10.

In some implementations, the user (e.g., user 46) may provide the selection of the one or more secure snapshots (e.g., selection of one or more secure snapshots 402) to the storage system support service (e.g., storage system support service 406). Secure snapshot deletion process 10 may provide the selection of the one or more secure snapshots (e.g., selection of one or more secure snapshots 402) in the above described secure form, document, or other file for processing by a storage system support service (e.g., storage system support service 406). In one example, secure snapshot deletion process 10 may provide 304 the selection of the one or more secure snapshots (e.g., selection of one or more secure snapshots 402) separately from the snapshot deletion key (e.g., snapshot deletion key 404). In another example, secure snapshot deletion process 10 may provide 304 the selection of the one or more secure snapshots (e.g., selection of one or more secure snapshots 402) with the snapshot deletion key (e.g., snapshot deletion key 404).

Providing 304 the selection of the one or more secure snapshots and the snapshot deletion key to a storage system support service may include submitting the selection of the one or more secure snapshots (e.g., selection of one or more secure snapshots 402) and/or the snapshot deletion key (e.g., snapshot deletion key 404) via a single graphical user interface. Additionally and/or alternatively, the selection of the one or more secure snapshots (e.g., selection of one or more secure snapshots 402) and/or the snapshot deletion key (e.g., snapshot deletion key 404) may be provided 304 via separate user interfaces and/or communication methods.

For example, the selection of the one or more secure snapshots (e.g., selection of one or more secure snapshots 402) may be submitted via e.g., a graphical user interface while the snapshot deletion key (e.g., snapshot deletion key 404) may be submitted via e.g., a telephone call. Accordingly, it will be appreciated that the selection of the one or more secure snapshots (e.g., selection of one or more secure snapshots 402) and/or the snapshot deletion key (e.g., snapshot deletion key 404) may be provided 304 to the storage system support service (e.g., storage system support service 406) in various ways within the scope of the present disclosure.

Referring again to FIG. 4, the providing 304 the selection of the one or more secure snapshots (e.g., selection of the one or more snapshots 402) and the snapshot deletion key (e.g., snapshot deletion key 404) to the storage system support service (e.g., storage system support service 406) is shown as the arrow between client electronic device 38 and storage system support service 406 labeled "3". While "3" may indicate a third step, it will be appreciated that this action may happen at any point during secure snapshot deletion process 10 (i.e., before or after any number of preceding or subsequent actions).

Providing 304 the selection of the one or more secure snapshots and the snapshot deletion key to a storage system support service may include authenticating 312, via the storage system support service, the selection of one or more secure snapshots to remove from a storage system. For example and as discussed above, secure snapshot deletion process 10 may provide 304 the selection of the one or more secure snapshots (e.g., selection of one or more secure snapshots 402) independently from the snapshot deletion key (e.g., snapshot deletion key 404). In this example, secure snapshot deletion process 10 may provide the selection of the one or more secure snapshots (e.g., selection of one or more secure snapshots 402) for authentication.

For example, secure snapshot deletion process 10 may provide the selection of the one or more secure snapshots (e.g., selection of one or more secure snapshots 402) to a support service engineer (e.g., user 50) for submission into an authentication system configured to confirm the identity of the storage system administrator (e.g., user 46), confirm the storage system administrator's credentials, confirm the ownership and access rights associated with the selected one or more snapshots, etc. In this manner, secure snapshot deletion process 10 may authenticate 312, via the storage system support service, the selection of one or more secure snapshots to delete from a storage system.

In some implementations, secure snapshot deletion process 10 may receive 306 a snapshot deletion response from the storage system support service. With the selection of the one or more secure snapshots and the snapshot deletion key from the storage system, secure snapshot deletion process 10 may generate a snapshot deletion response. A snapshot deletion response may generally include a protected key configured to indicate which secure snapshots from the plurality of secure snapshots (e.g., plurality of secure snapshots 400) are capable of being deleted. Secure snapshot deletion process 10 may generate the snapshot deletion response (e.g., snapshot deletion response 408) by receiving, from a support service engineer (e.g., user 50), via an internal secure web portal using their corporate credentials, the snapshot deletion key (e.g., snapshot deletion key 404) along with the selection of the one or more secure snapshots (e.g., selection of one or more secure snapshots 402).

In this example, the web portal application may utilize the selection of the one or more secure snapshots (e.g., selection of one or more secure snapshots 402) and the snapshot deletion key (e.g., snapshot deletion key 404) to generate the snapshot deletion response (e.g., snapshot deletion response 408). In some implementations, the snapshot deletion response (e.g., snapshot deletion response 408) may be generated by combining and/or hashing the selection of the one or more secure snapshots (e.g., selection of one or more secure snapshots 402) and the snapshot deletion key (e.g., snapshot deletion key 404). However, it will be appreciated that the snapshot deletion response (e.g., snapshot deletion response 408) may be generated with various features within the scope of the present disclosure. As will be discussed in greater detail below, secure snapshot deletion process 10 may digitally sign the snapshot deletion response (e.g., snapshot deletion response 408) with a private key (e.g., private key 410) as part of an asymmetric cryptographic system. However, it will be appreciated that snapshot deletion response (e.g., snapshot deletion response 408) may be digitally signed and/or encrypted with various cryptographic systems within the scope of the present disclosure.

Referring again to FIG. 4, the receiving 306 a snapshot deletion response (e.g., snapshot deletion response 408) from the storage system support service (e.g., storage system support service 406) is shown as the arrow between storage system support service 406 and computing device 38 labeled "4". While "4" indicates a fourth step, it will be appreciated that this action may happen at any point during secure snapshot deletion process 10 (i.e., before or after any number of preceding or subsequent actions).

In some implementations, secure snapshot deletion process 10 may authenticate 308, via the storage system, the snapshot deletion response and the selection of the one or more secure snapshots. For example and as discussed above, secure snapshot deletion process 10 may return the snapshot deletion response (e.g., snapshot deletion response 408) to the storage system administrator (e.g., user 46 on client electronic device 38). Authenticating 308, via the storage system, the snapshot deletion response and the selection of the one or more secure snapshots may include providing 314 the snapshot deletion response and the selection of the one or more secure snapshots to the storage system. In this example, secure snapshot deletion process 10 may provide 314 the snapshot deletion response (e.g., snapshot deletion response 408) and the selection of the one or more secure snapshots (e.g., selection of one or more secure snapshots 402) to the storage system (e.g., storage system 12).

In this manner, secure snapshot deletion process 10 may prevent any individual from unilaterally deleting secure snapshots from the storage system as the storage system administrator provides the snapshot deletion response (e.g., snapshot deletion response 408) and the selection of the one or more secure snapshots (e.g., selection of one or more secure snapshots 402) to the storage system (e.g., storage system 12). Accordingly, the plurality of secure snapshots (e.g., plurality of secure snapshots 400) may be insulated from the storage system support service (e.g., storage system support service 406) by requiring the storage system administrator (e.g., user 46) to authenticate the snapshot deletion response (e.g., snapshot deletion response 408) with the storage system (e.g., storage system 12) before unlocking any secure snapshots for deletion.

Authenticating 308, via the storage system, the snapshot deletion response and the selection of the one or more secure snapshots may include authenticating 316, via the storage system, the snapshot deletion response based upon, at least in part, an asymmetric cryptographic system. For example, secure snapshot deletion process 10 may authenticate 316 the snapshot deletion response (e.g., snapshot deletion response 408) using a public key (e.g., public key 412) corresponding to the private key (e.g., private key 410) of the storage system support service (e.g., storage system support service 406). In this manner, snapshot deletion response (e.g., snapshot deletion response 408) may be decrypted using the public key (e.g., public key 412). The snapshot deletion key (e.g., snapshot deletion key 404) and the decrypted/signed snapshot deletion response (e.g., snapshot deletion response 408) may be compared to each other. If they are identical, the snapshot deletion response (e.g., snapshot deletion response 408) may be accepted. Otherwise, the snapshot deletion response (e.g., snapshot deletion response 408) may be rejected. While an example of a digital signature has been described above for the asymmetric cryptographic system, it will be appreciated that this is for example purposes only. It will also be appreciated that symmetric cryptographic systems may be used within the scope of the present disclosure as well.

In some implementations, secure snapshot deletion process 10 may authenticate 308 the snapshot deletion response (e.g., snapshot deletion response 408) based upon, at least in part the selection of the one or more secure snapshots (e.g., selection of one or more secure snapshots 402). For example, secure snapshot deletion process 10 may determine from the snapshot deletion response (e.g., snapshot deletion response 408) which secure snapshots from the plurality of secure snapshots (e.g., plurality of secure snapshots 400) are available for deletion. Suppose, for example purposes only, that secure snapshot deletion process 10 receives 300 a selection of e.g., three secure snapshots (e.g., secure snapshots 414, 416, 418) for deletion from the storage system (e.g., storage system 12). In this example, suppose that secure snapshot deletion process 10 receives 302 a snapshot deletion key (e.g., snapshot deletion key 404) from the storage system (e.g., storage system 12). In response to providing 304 the snapshot deletion key (e.g., snapshot deletion key 404) and the selection of the one or more secure snapshots (e.g., selection of one or more secure snapshots 402), secure snapshot deletion process 10 may receive 306 a snapshot deletion response (e.g., snapshot deletion response 408) and may authenticate 308 snapshot deletion response 408. In this example, snapshot deletion response 408 may include the UUIDs of the three secure snapshots (e.g., secure snapshots 414, 416, 418). Accordingly, secure snapshot deletion process 10 may limit any requests to delete secure snapshots to the three secure snapshots (e.g., secure snapshots 414, 416, 418).

For example, secure snapshot deletion process 10 may provide a user interface for entering which secure snapshots to delete (e.g., selection of one or more secure snapshots 402). If the selection of secure snapshots (e.g., selection of one or more secure snapshots 402) provided to the storage system (e.g., storage system 12) includes any secure snapshots not described in the snapshot deletion response (e.g., snapshot deletion response 408), secure snapshot deletion process 10 may prevent those secure snapshots from being deleted. In this manner, secure snapshot deletion process 10 may prevent unauthorized deletion of secure snapshots from the storage system.

Referring again to FIG. 4, the authenticating 308, via the storage system, the snapshot deletion response and the selection of the one or more secure snapshots is shown as the arrow between computing device 38 and storage system 12 labeled "5". While "5" indicates a fifth step, it will be appreciated that this action may happen at any point during secure snapshot deletion process 10 (i.e., before or after any number of preceding or subsequent actions).

In response to authenticating the snapshot deletion response and the selection of the one or more secure snapshots, secure snapshot deletion process 10 may unlock 310 the one or more secure snapshots for deletion. Unlocking 310 the one or more secure snapshots may include enabling a storage system administrator (e.g., user 46) to delete the secure snapshots specified by the selection of one or more secure snapshots (e.g., selection of one or more secure snapshots 402) and the snapshot deletion response (e.g., snapshot deletion response 408). Continuing with the above example, suppose that the selection of one or more secure snapshots (e.g., selection of one or more secure snapshots 402) and the snapshot deletion response (e.g., snapshot deletion response 408) reference the same three secure snapshots (e.g., secure snapshots 414, 416, 418). In this example, secure snapshot deletion process 10 may unlock the three secure snapshots (e.g., secure snapshots 414, 416, 418) for deletion by the storage system administrator (e.g., user 46). For example, secure snapshot deletion process 10 may provide a user interface for the storage system administrator (e.g., user 46) to select the three secure snapshots (e.g., secure snapshots 414, 416, 418) for deletion.

Unlocking 310 the one or more secure snapshots for deletion may include providing 318 a limited period of time for unlocking the one or more secure snapshots for deletion. For example, when unlocking 310 the one or more secure snapshots, secure snapshot deletion process 10 may provide 318 a predefined, limited period of time for authenticating 308 the snapshot deletion response and the selection of the one or more secure snapshots and unlocking 310 the one or more secure snapshots. The limited period of time may be a default amount of time, may be user-defined, may be storage system support service-defined, and/or may be automatically defined by secure snapshot deletion process 10. If the user does not authenticate the snapshot deletion response and unlock the one or more secure snapshots for deletion within the limited period of time and/or if the user chooses to end the session, any further attempts to delete or modify secure snapshots may fail with an appropriate error message. After the limited period of time, any attempt to unlock secure snapshots may require repeating the above-described process of secure snapshot deletion process 10.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving a selection of one or more secure snapshots to remove from a storage system;
   receiving a snapshot deletion key from the storage system;
   providing the selection of the one or more secure snapshots and the snapshot deletion key to a storage system support service;
   receiving a snapshot deletion response from the storage system support service;
   authenticating, via the storage system, the snapshot deletion response and the selection of the one or more secure snapshots; and
   in response to authenticating the snapshot deletion response and the selection of the one or more secure snapshots, unlocking the one or more secure snapshots for deletion.

2. The computer-implemented method of claim 1, wherein the selection of the one or more secure snapshots to remove from a storage system include a list of one or more predefined universally unique identifiers (UUIDs) assigned to the one or more secure snapshots.

3. The computer-implemented method of claim 1, wherein the snapshot deletion key is unique to the storage system.

4. The computer-implemented method of claim 1, wherein providing the selection of the one or more secure snapshots and the snapshot deletion key to a storage system support service includes:
   authenticating, via the storage system support service, the selection of one or more secure snapshots to remove from a storage system.

5. The computer-implemented method of claim 1, wherein authenticating, via the storage system, the snapshot deletion response and the selection of the one or more secure snapshots includes:
   providing the snapshot deletion response and the selection of the one or more secure snapshots to the storage system.

6. The computer-implemented method of claim 1, wherein authenticating, via the storage system, the snapshot deletion response and the selection of the one or more secure snapshots includes:
   authenticating, via the storage system, the snapshot deletion response based upon, at least in part, an asymmetric cryptographic system.

7. The computer-implemented method of claim 1, wherein unlocking the one or more secure snapshots for deletion includes:
   providing a limited period of time for unlocking the one or more secure snapshots for deletion.

8. A computer program product residing on a non-transitory computer readable medium having a plurality of instructions stored thereon which, when executed by a processor, cause the processor to perform operations comprising:
   receiving a selection of one or more secure snapshots to remove from a storage system;
   receiving a snapshot deletion key from the storage system;
   providing the selection of the one or more secure snapshots and the snapshot deletion key to a storage system support service;
   receiving a snapshot deletion response from the storage system support service;
   authenticating, via the storage system, the snapshot deletion response and the selection of the one or more secure snapshots; and
   in response to authenticating the snapshot deletion response and the selection of the one or more secure snapshots, unlocking the one or more secure snapshots for deletion.

9. The computer program product of claim 8, wherein the selection of the one or more secure snapshots to remove from a storage system include a list of one or more predefined universally unique identifiers (UUIDs) assigned to the one or more secure snapshots.

10. The computer program product of claim 8, wherein the snapshot deletion key is unique to the storage system.

11. The computer program product of claim 8, wherein providing the selection of the one or more secure snapshots and the snapshot deletion key to a storage system support service includes:
    authenticating, via the storage system support service, the selection of one or more secure snapshots to remove from a storage system.

12. The computer program product of claim 8, wherein authenticating, via the storage system, the snapshot deletion response and the selection of the one or more secure snapshots includes:
    providing the snapshot deletion response and the selection of the one or more secure snapshots to the storage system.

13. The computer program product of claim 8, wherein authenticating, via the storage system, the snapshot deletion response and the selection of the one or more secure snapshots includes:
    authenticating, via the storage system, the snapshot deletion response based upon, at least in part, an asymmetric cryptographic system.

14. The computer program product of claim 8, wherein unlocking the one or more secure snapshots for deletion includes:
    providing a limited period of time for unlocking the one or more secure snapshots for deletion.

15. A computing system comprising:
    a memory; and
    a processor configured to receive a selection of one or more secure snapshots to remove from a storage system, wherein the processor is further configured to receive a snapshot deletion key from the storage system, wherein the processor is further configured to provide the selection of the one or more secure snapshots and the snapshot deletion key to a storage system support service, wherein the processor is further configured to receive a snapshot deletion response from the storage system support service, wherein the processor is further configured to authenticate, via the storage system, the snapshot deletion response and the selection of the one or more secure snapshots, and wherein the processor is further configured to unlock the one or more secure snapshots for deletion in response to authenticating the snapshot deletion response and the selection of the one or more secure snapshots.

16. The computing system of claim 15, wherein the selection of the one or more secure snapshots to remove from a storage system include a list of one or more predefined universally unique identifiers (UUIDs) assigned to the one or more secure snapshots.

17. The computing system of claim 15, wherein the snapshot deletion key is unique to the storage system.

18. The computing system of claim 15, wherein providing the selection of the one or more secure snapshots and the snapshot deletion key to a storage system support service includes:
- authenticating, via the storage system support service, the selection of one or more secure snapshots to remove from a storage system.

19. The computing system of claim 15, wherein authenticating, via the storage system, the snapshot deletion response and the selection of the one or more secure snapshots includes:
- providing the snapshot deletion response and the selection of the one or more secure snapshots to the storage system.

20. The computing system of claim 15, wherein authenticating, via the storage system, the snapshot deletion response and the selection of the one or more secure snapshots includes:
- authenticating, via the storage system, the snapshot deletion response based upon, at least in part, an asymmetric cryptographic system.

\* \* \* \* \*